Aug. 14, 1951  V. S. BROWN  2,564,323
ADJUSTABLE HEADREST FOR CREEPERS
Filed May 12, 1949

Inventor
VIRGIL S. BROWN
By *Jerome W. Payton*
Agt.

Patented Aug. 14, 1951

2,564,323

UNITED STATES PATENT OFFICE 2,564,323

ADJUSTABLE HEADREST FOR CREEPERS

Virgil S. Brown, Prescott, Iowa

Application May 12, 1949, Serial No. 92,777

3 Claims. (Cl. 5—327)

1

The present invention relates to adjustable headrests, and more particularly has reference to an adjustable headrest for wheeled vehicles of the type referred to as "creepers."

I am cognizant of the fact that devices have heretofore been provided for pivotally mounting a head rest or back support to a creeper, together with means whereby the headrest may be maintained at the desired angular position. However, the majority of these headrests have been quite complex in structural detail, which not only materially increases the cost of manufacture, but also necessitates considerable outlay in repair and replacement problems. Furthermore, many of the headrests necessitate a material modification of the creeper per se which, of course, is not desirable. Accordingly, a salient object of the present invention is to provide a headrest for creepers which will overcome the foregoing and other objectionable characteristics and which may be readily installed with all types of creepers currently being employed.

Another object of the present invention is to provide an adjustable headrest which is simple in construction, positive and efficient in operation and capable of being inexpensively manufactured.

A further object of the invention is to provide an adjustable headrest for creepers wherein the mechanism for changing the angular position of the headrest relative to the creeper body is supported by the creeper body at a point easily accessible to the hand of the mechanic or other person employing the creeper.

Another object of the invention is to provide a headrest for a creeper which may be quickly and easily installed on or detached from conventional creeper assemblies.

Briefly, the invention comprises a crank-like element which is rotatably mounted at the head end of the creeper, one end of the crank-like element having a rocker arm operatively connected to a push pull rod extending longitudinally of the creeper, the push pull rod cooperating with a notched bar or bracket on the side of the creeper for moving the crank-like element to various angular positions and maintaining the element in the desired angular position. A cushion or other type of head support is attached to the crank-like element, and an operating member is carried by the push pull rod at a point within the reach of the mechanic for effecting the desired movement of the push pull rod.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
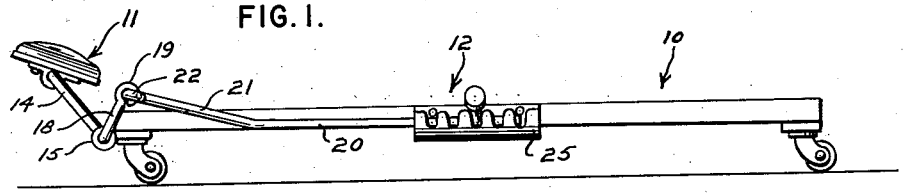
Figure 1 is a view in side elevation of a creeper equipped with the adjustable and operating means forming the subject of the present invention.
Figure 2:
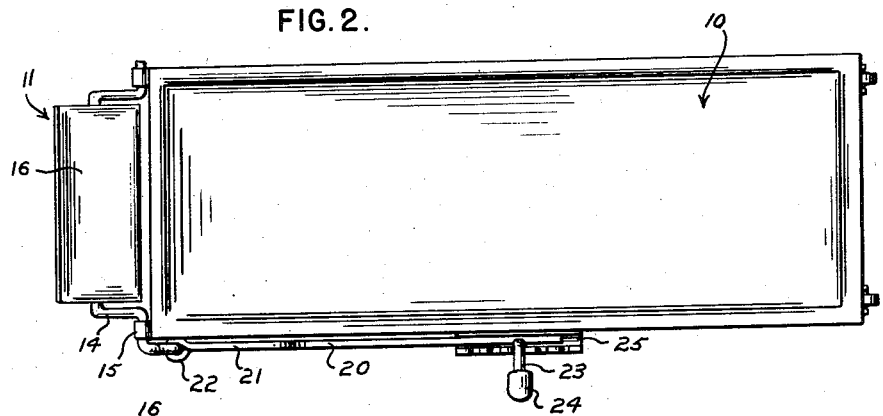
Figure 2 is a plan view of the creeper shown in Figure 1.
Figure 3:
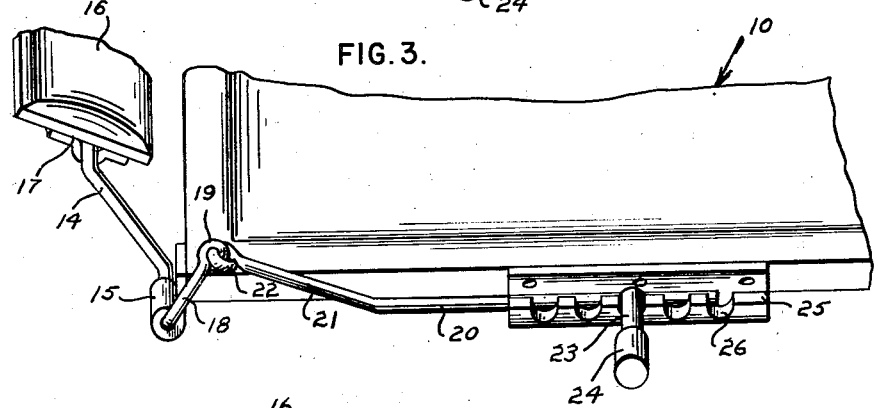
Figure 3 is a fragmental detail view showing the component parts of the invention.
Figure 4:
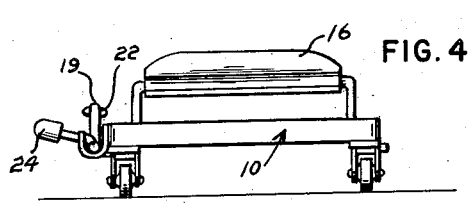
Figure 4 is an end view of the invention shown in Figure 1, the view looking toward the head end of the creeper.

Referring to Figure 1, there is illustrated a wheeled creeper 10 of any desirable type, an adjustable headrest 11, and a manually operative unit 12 for moving the headrest to various angular positions relative to the body of the creeper and maintaining it in the correct position.

The headrest 11 includes a crank element 14, the ends of which are journaled in brackets 15 conveniently attached to the head end of the creeper 10. A cushion 16 is secured to the crank intermediate the ends thereof in any suitable manner, as indicated at 17.

One of the ends of the crank 14 (right end) is provided with an integral arm 18 which is disposed at an angle of 20 degrees when the cushion 16 is in horizontal alinement with the creeper surface and the arm terminates in an eye 19 at a point beyond the side of the creeper. A push pull rod 20 which extends longitudinally of and in parallel relation to the side of the creeper is downturned, as at 21, and formed with a hook-like member 22 which engages the eye 19. A lateral extension 23 having a grip 24 is secured to the rod 20 near the free end thereof and the extension extends outwardly from the rod. It will further be noted that the grip 24 is located on the rod 20 at a position which is easily accessible to the mechanic's hand.

A U-shaped bracket 25 is attached to the side of the creeper 10 intermediate the length thereof and below the upper surface of the creeper. The outer leg of the U-shaped bracket is provided with a plurality of equally spaced notches or cutout portions 26, and while I have shown the use of five such notches, it is, of course, obvious that a more or less number may be employed.

The rod 20 is adapted to extend in a channel or guideway formed by the legs of the bracket and by locating the extension 23 in one of the notches 26, the rod 20, crank element 14 and headrest 16 will be secured in the position denoted by that particular notch.

In operation, the extension 23 is normally in the notch 26 closest to the head end of the creeper which positions the headrest 16 in horizontal alinement with the upper surface of creeper. When the creeper is moved to the desired location and the user determines which angular position the headrest should assume, he grasps the grip portion 24 and raises the extension 23 out of the notch and by moving the rod 20 the desired distance and inserting the extension in the notch corresponding to that distance, the cushion 16 will be firmly secured in its adjusted position.

Hence, it can be seen that I have provided an adjustable headrest which includes few essential working parts and which can be easily and quickly installed with all types of creepers. The desired adjustment of the headrest may be made in an easy manner and by virtue of the accessibility of the control for moving the push pull rod. By virtue of its simplicity, the unit may be cheaply manufactured and the upkeep costs are negligible.

While I have shown the operating mechanism for the headrest being located on the right hand side of the creeper, it is, of course, clear that this mechanism could be installed on the opposite side. The crank element 14 may be held in proper position by locating a split washer on opposite sides of the bracket 15 adjacent the left hand side of the creeper and the washers may fit in notches provided in the crank. This arrangement will maintain the crank in proper position on the creeper.

The invention is not to be confined to any strict conformity with the showing in the drawing, but may be changed or modified so long as such changes or modifications mark no material departure from the salient features of the invention as expressed in the appended claims.

I claim:

1. In the combination of a creeper frame and a headrest therefor, a crank element journaled at one end of the frame, a cushion supported by the crank element, an arm on the crank element, a push pull rod operatively connected to said arm, a notched bar supported by the frame intermediate the length thereof, and means carried by the rod located in a position to be grasped by the hand of the user to manipulate the pull rod for adjusting and for holding said rod, crank element and cushion at the desired position by engagement with one of the notches in the bar.

2. The combination as claimed in claim 1 wherein said means includes a lateral extension and a grip thereon.

3. The combination as claimed in claim 1 wherein the push pull rod is pivotally connected to said arm.

VIRGIL S. BROWN.

REFERENCES CITED

The following references are of record in the file of this patent:

UNITED STATES PATENTS

| Number | Name | Date |
| --- | --- | --- |
| 2,054,598 | Goldenberg | Sept. 15, 1936 |
| 2,463,410 | Morris | Mar. 1, 1949 |